(12) United States Patent
Amstutz et al.

(10) Patent No.: US 8,413,268 B2
(45) Date of Patent: Apr. 9, 2013

(54) REST ARRANGEMENT

(75) Inventors: Stefan Amstutz, Hamburg (DE); Holger Warner, Jork (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/060,312

(22) PCT Filed: Aug. 13, 2009

(86) PCT No.: PCT/EP2009/060471
§ 371 (c)(1),
(2), (4) Date: Feb. 23, 2011

(87) PCT Pub. No.: WO2010/026026
PCT Pub. Date: Mar. 11, 2010

(65) Prior Publication Data
US 2011/0154567 A1  Jun. 30, 2011

Related U.S. Application Data

(60) Provisional application No. 61/190,024, filed on Aug. 25, 2008.

(30) Foreign Application Priority Data

Aug. 25, 2008 (DE) .......................... 10 2008 039 635

(51) Int. Cl.
*A47C 19/20* (2006.01)
*B64D 11/00* (2006.01)
(52) U.S. Cl.
USPC ........... 5/118; 5/136; 5/9.1; 5/147; 244/118.6

(58) Field of Classification Search ............... 5/9.1, 118, 5/136, 137, 139–144, 147; 244/118.6; 105/319, 105/321; 296/174, 190.02
See application file for complete search history.

(56) References Cited

U.S. PATENT DOCUMENTS

| | | | | |
|---|---|---|---|---|
| 622,993 | A | * | 4/1899 | Chamberlain ..................... 5/9.1 |
| 2,550,599 | A | * | 4/1951 | Reed ................................. 5/9.1 |
| 3,898,704 | A | | 8/1975 | Gallaher et al. |

(Continued)

FOREIGN PATENT DOCUMENTS

| | | |
|---|---|---|
| DE | 692048 C | 6/1940 |
| DE | 3029846 A1 | 2/1981 |
| DE | 102004035160 A1 | 2/2006 |
| WO | 2006008151 A1 | 1/2006 |

OTHER PUBLICATIONS

International Search Report, PCT/EP2009/060471, dated Apr. 1, 2010.

*Primary Examiner* — Michael Trettel
(74) *Attorney, Agent, or Firm* — Lerner, David, Littenberg, Krumholz & Mentlik, LLP

(57) ABSTRACT

According to an exemplary embodiment of the present invention, a rest arrangement is provided, comprising a first support element and a lying-down facility. The lying-down facility comprises a first fastening region which in turn comprises a first fastening element and a second fastening element. The lying-down facility is affixed to the support element with the use of the first and the second fastening elements. The lying-down facility is slidable or pivotable between a first state in which the lying-down facility is arranged so as to be essentially horizontal, and a second state, wherein the transition between the first state and the second state takes place as a combined rotational movement and translational movement.

14 Claims, 13 Drawing Sheets

U.S. PATENT DOCUMENTS

| | | | |
|---|---|---|---|
| 4,483,027 A * | 11/1984 | Cowell et al. | 5/136 |
| 6,663,173 B1 * | 12/2003 | Corfitsen | 297/62 |
| 7,052,441 B2 | 5/2006 | Sankrithi | |
| 7,207,076 B2 * | 4/2007 | Gardner | 5/9.1 |
| 2005/0217021 A1 | 10/2005 | Gardner | |
| 2007/0295862 A1 | 12/2007 | Hupperich et al. | |

* cited by examiner

REST ARRANGEMENT

CROSS-REFERENCE TO RELATED APPLICATIONS

This application is a national phase entry under 35 U.S.C. §371 of International Application No. PCT/EP2009/060471, filed Aug. 13, 2009, published in German, which claims the benefit of the filing date of U.S. provisional patent application No. 61/190,024, filed on Aug. 25, 2008 and of German Patent Application No. 10 2008 039 635.4, filed on Aug. 25, 2008, the entire disclosures of which are hereby incorporated herein by reference.

FIELD OF THE INVENTION

The present invention relates to a rest arrangement, to the use of a rest arrangement according to the invention in a means of transport, and to a means of transport comprising a rest arrangement according to the invention.

BACKGROUND OF THE INVENTION

On long-haul flights it is possible for the legally permitted work hours for an aircrew to be exceeded. There may thus be a legal requirement from a certain flight duration onwards to carry along a replacement crew or change crew. In order to provide this additional aircrew during that part of a flight when they are not on duty with adequate rest and relaxation in order to take up duty at a suitable time, in modern day aircraft, in particular in wide-bodied passenger aircraft, relaxation facilities are provided which make it possible for at least part of an aircrew to relax or to rest, for example to read a book or to sleep.

Various solutions for such relaxation facilities may be provided.

For example, in an aircraft, crew rest compartments may be provided that are usually special, separate spaces with seating facilities or lying-down facilities and which as a rule are exclusively used by members of the aircrew.

However, such a crew rest compartment takes up useful space in an aircraft, which space with a different interior setup could have been used for the transport of further passengers or additional freight.

In addition, crew rest compartments usually have a heavy intrinsic weight and due to their design as large monuments in an aircraft interior they cannot be removed or reconfigured at short notice when required; in any case they must thus be left as dead mass in the aircraft.

As a further relaxation facility a regular passenger seat, for example in economy class, may be reserved for a member of an aircrew, which seat is then usually separated from the rest of the passenger cabin by means of a curtain.

Even if a regular passenger seat is used, space is lost which could otherwise have been made available for a paying passenger, i.e. revenue space is lost. Furthermore, regular passenger seats usually provide only little comfort and little privacy when used as relaxation facilities.

Furthermore, the use of a high-comfort cabin attendant seat (CAS) as a relaxation facility is imaginable. Such a high-comfort cabin attendant seat may provide more comfort than an economy class passenger seat, for example by means of a contoured design with a tiltable backrest and additional leg-rest. Moreover, the use of corresponding business class seats or first class seats is imaginable.

While a high-comfort cabin attendant seat may provide improved relaxation comfort, it nevertheless, however, does not usually provide a flat area for lying down. Furthermore, due to its contoured form the sleeping comfort may be restricted.

Patent specification DE 10 2004 035 160 A1 or WO 2006/008 151 A1 describes a modular wall construction system for aircraft cabins, wherein by means of connecting elements individual prefabricated wall construction panels can quickly and without any additional tools be installed on the cabin floor so as to form spaces of various size and geometry.

Patent specification U.S. Pat. No. 3,898,704 describes convertible seat-bed equipment in which a seat with a tilted backrest can be converted to a bunk-type lying-down facility.

Conventional relaxation facilities for an aircrew thus usually provide little comfort or privacy, or else require a significant amount of space in an aircraft.

SUMMARY OF THE INVENTION

It may thus be considered an object of the present invention to provide a comfortable relaxation facility with an enlarged private sphere which at the same time features reduced weight and dimensions.

This object is met by a rest arrangement according to the invention in a means of transport, as well as by a means of transport with a rest arrangement according to the invention according to the independent claims.

According to an exemplary embodiment of the present invention, a rest arrangement is provided comprising a first support element and a lying-down facility. The lying-down facility comprises a first fastening region which in turn comprises a first fastening element and a second fastening element. The lying-down facility is affixed to the support element with the use of the first and the second fastening element. The lying-down facility is slidable or pivotable between a first state in which the lying-down facility is arranged so as to be essentially horizontal, and a second state, wherein the transition between the first state and the second state takes place as a combined rotational movement and translational movement.

According to a further exemplary embodiment of the present invention, a rest arrangement according to the invention is used in a means of transport.

According to a further exemplary embodiment of the present invention, a means of transport is created comprising a rest arrangement according to the invention.

In the context of the present invention the term "means of transport" may refer to any transport device that can convey passengers and/or goods or freight. This term includes air vehicles, rail vehicles, road vehicles, water vehicles, in particular aircraft, railways, buses, lorries, ships and the like.

The rest arrangement according to the invention may make it possible to temporarily rearrange a region, which for some time is used or required in a different manner, to become a relaxation region with relaxation facilities for an aircrew. This may, in particular, be made possible in that the unused region in questions is, in particular, unused at a particular period of time under consideration, for example the entrance region in the region of an aircraft door during a flight. The use of a corresponding region that is temporarily unused may make it possible without loss or with only minimal loss of revenue space to provide relaxation facilities for an aircrew.

In this arrangement the present invention makes it possible to provide generous horizontal lying-down facilities that are essentially completely flat. By means of a suitable design of the lying-down facilities in connection with the surrounding aircraft interior it may be possible to provide the relaxation facilities so that they are compact and self-contained per se, and in this way to provide lying-down facilities, for example, without gaps, edges or indentations.

In the context of the present invention it may thus also be possible to avoid the significant additional weight of conventional space-consuming crew rest compartments.

By providing additional flaps or foldable walls, insulation and/or curtains, furthermore it may be possible to provide more privacy to members of an aircrew, which privacy essentially corresponds to that of a separate crew rest compartment.

In this arrangement the rest arrangement according to the invention comprises at least one lying-down facility, preferably, however, several lying-down facilities, for example two or three lying-down facilities that are arranged one above the other and that by means of a bearing arrangement according to the invention are slidable, hingeable or foldable.

The lying-down facility is fastened to a first support element, for example a metal construction or a compartment in a correspondingly designed wall of an element of the aircraft interior. In a first fastening region the lying-down facility is connected to the support element by means of at least two identical or different fastening elements. From a second state, in which the lying-down facility is arranged so as to be essentially folded away, for example vertically positioned, in a recess on a wall or the like, said lying-down facility can be slid or pivoted to a first state in which the lying-down facility is arranged so as to be essentially horizontal and parallel to the floor of the aircraft cabin.

In the first state the use according to the invention of the lying-down facility as a relaxation facility for a member of an aircrew is provided.

A particularly preferred low pivoting region may be able to be achieved by pivoting the lying-down facility, which pivoting represents a combination of a rotational movement and a translational movement.

In this arrangement the crew rest region, in other words the region with the rest arrangement in place, may comprise several, for example two or three, lying-down facilities that are arranged one on top of the other and that are foldable, which lying-down facilities may be arranged between a first and a second delimitation, for example a front wall of the aircraft interior and a housing.

Each lying-down facility may comprise a stowage compartment for personal items. At a fastening region the lying-down facilities may be fastened to a slidable pivot joint or slider so as to be pivotable on a horizontal axis. The pivot joint is slidably held and may move in a linear guide on the first support element in a housing which also may only permit movement in a degree of freedom.

On the side of the first fastening region, which in each case is opposite the pivot joint, the lying-down facilities may be guided by way of a strut or a cable or a link slide/guide bar/guide rail. In this context the term "link slide" may refer to a fitting which enforces a predetermined movement path to the guided fastening point. A symmetrical arrangement on both sides of slidable pivot joints or of a guide is also imaginable.

In their respective end positions the slidable pivot joints may lock, in particular with the lying-down facility in the horizontal position. On both sides of the second fastening region of the lying-down facilities there may be bearing points which, when the lying-down facilities are arranged so as to be horizontal, engage receiving points provided for this purpose on the second carrier element, and/or lock in place in said position.

Furthermore, with corresponding dimensions of the crew rest region, a design comprising several lying down facilities side-by-side on each plane is also imaginable.

In each lying-down facility a supply unit may be arranged, among other things comprising a reading light, air nozzle, oxygen supply, entertainment systems and/or an attendant station.

For improved comfort, barriers may be provided in the side region or on the individual beds (for example some insulation or secondary lining or curtains or a foldable wall).

Furthermore, a design is imaginable in which a cabin attendant seat is arranged in front of the rest arrangement in the second state. This cabin attendant seat may be laterally pivoted by way of an articulated mechanism in order to in this manner subsequently make it possible for the rest arrangement to be moved from the second state to the first state.

A cabin attendant seat pivoted to the side may already ensure an improved private sphere of at least some of the lying-down facilities. A design of two lying-down facilities may easily be achieved by leaving out one of the lying-down facilities, for example the bottom lying-down facility.

Corresponding geometric adaptations are imaginable so that when an individual lying-down facility is left out the space available for the other lying-down facilities may be increased.

If corresponding space is available, several facilities on each plane may be arranged side-by-side, for example in order to in this way provide a rest arrangement comprising six lying-down facilities.

Further exemplary embodiments of the present invention are disclosed in the dependent claims.

Below, embodiments of the rest arrangement according to the invention are described. However, these embodiments also apply to the use of the rest arrangement according to the invention in a means of transport and to the means of transport comprising a rest arrangement according to the invention.

According to a further exemplary embodiment of the present invention, the rest arrangement may furthermore comprise at least one further lying-down facility, wherein the lying-down facilities in the first state are arranged one above the other.

Such a design may make it possible, with an essentially unchanged space requirement of the rest arrangement according to the invention, to provide a multiple number, e.g. double the number, of lying-down facilities as relaxation facilities for members of an aircrew. The aforesaid may thus furthermore be arranged at different heights and may thus also be able to cater for different relaxation preferences of members of an aircrew.

The at least one further lying-down facility may on the one hand also carry out a combined rotational and translational movement during the transition, or on the other hand may alternatively only carry out a rotational movement or a translational movement.

It is thus imaginable to provide a further lying-down facility in the rest arrangement according to the invention, for which lying-down facility the space due to adjacent boundary surfaces, for example the floor or the ceiling of an aircraft cabin, is not suitable for a design with a combined rotational and translational movement. Thus the further lying-down facilities may essentially have been subsequently affixed directly to such a delimitation, for example in the floor, and thus for the movement between the first and the second state may simply be folded out or folded into place without having to carry out a corresponding translational movement.

According to a further exemplary embodiment of the present invention, at least one of the first and the second fastening elements may be designed as a pivot joint and may be slidably affixed to the support element.

A corresponding design of a fastening element may make it possible in a simple manner to provide a combined rotational and translational movement. Thus the rotation part may be considered as a rotation on the pivot joint, which may for example comprise a degree of freedom, while at the same time the fastening element at the support element may be displaced by sliding, which is also to be considered as a degree of freedom.

According to a further exemplary embodiment of the present invention, at least one of the first and second fastening elements may be designed as an element of the group comprising a strut, cable and link slide.

A corresponding design of the cable or strut may, for example, make it possible to effectively absorb or deflect lever forces that occur. Furthermore, in particular by means of a strut it may be possible, in conjunction with a previously described first or second fastening element, to make possible a defined uniform movement which essentially in its totality can be precisely defined.

For example, a combination of a fastening element designed as a slidable pivot joint together with a fastening element designed as a strut makes it possible to carry out a precisely defined and determinable combined rotational and translational movement.

According to a further exemplary embodiment of the present invention, each lying-down facility may comprise a second fastening region in which the lying-down facility can be affixed to a further support element.

In this arrangement the further support element may be adapted as a support element that is identical to, or similar to, the first support element, for example a further wall of an aircraft interior. It may thus be possible to affix and/or support the lying-down facility in a further region, for example at the end opposite the first fastening region. As an alternative, the second support element, fastened to the lying-down facility in the second fastening region, may be designed so as to be foldably integrated in the lying-down facility.

By means of a corresponding design with a possible support or fastening to both fastening regions it may be possible to effectively prevent lever forces acting on the fastening structure.

According to a further preferred embodiment of the present invention, at least one element from the group comprising a first fastening element, a second fastening element, a first fastening region and a second fastening region may be provided for detachable affixing in at least one of the first state and the second state.

In this context the term "detachable affixing" may refer to automatically or manually locking fastening, which fastening may in turn be undone manually or automatically.

By means of detachable affixing, the lying-down facilities may reliably be affixed in one of the first and/or second state. Thus further safety regulations, for example in the field of aircraft relating to the aircraft interior, may be implemented. Moreover, it may be ensured that unintended displacement or movement of the lying-down facility at least in part from a respective state to the respective other state is effectively prevented.

According to a further exemplary embodiment of the present invention, in the second state the lying-down facility may be arranged so as to be essentially vertical.

In the case of a plurality of lying-down facilities, they may be arranged so as to be essentially vertical and parallel. In particular, in this arrangement the lying-down facilities may be arranged essentially without any interspace, and thus comprise an increased or maximum packing density.

In this arrangement the second state may be considered as a state of non-use of the lying-down facility according to the invention or of the rest arrangement according to the invention. In the second state the lying-down facilities may, for example, be completely arranged in a space or a recess or a niche and may possibly finish off in a planar surface.

Thus visually unobtrusive stowing away of the rest arrangement in its non-used state may be achievable.

According to a further exemplary embodiment of the present invention, at least one lying-down facility may comprise a single-piece area for lying down.

In this context the term "single piece" may be interpreted as referring to being compact and continuous without significant interruption.

A single-piece area for lying down may thus provide good lying-down comfort without indentations, curvatures, kinks or edges of parts that intersect or that occupy some sections resulting in an uncomfortable body posture or in non-ergonomic introductions of force.

According to a further exemplary embodiment of the present invention, the rest arrangement according to the invention may furthermore comprise at least one element from the group comprising a force support element and an actuator, which element is adapted to support and/or automate pivoting of a lying-down facility between the first state and the second state.

By means of a corresponding element it may be made possible to make possible the pivoting of a lying-down facility, in other words the transition of a lying-down facility between a first and a second state with little or no force required.

For example a spring element may be provided which when suitably affixed, compensates for part of the weight force of a lying-down facility, thus making it possible to move the lying-down facility with reduced force required.

Furthermore, an actuator, for example a pneumatic, electrical or hydraulic actuator, may be provided which, manually or automatically controlled, carries out a movement of a lying-down facility between the first and the second state without any influence of force.

Below, embodiments of the means of transport according to the invention, comprising a rest arrangement according to the invention, are described. However, these embodiments apply both to the rest arrangement according to the invention and to the use of a rest arrangement according to the invention in a means of transport.

According to a further exemplary embodiment of the present invention, the rest arrangement according to the invention comprises a quick-change fastening element on the first support element, wherein with the use of the quick-change fastening element the first support element is detachably affixable to an element of the structure of the means of transport.

By means of such an embodiment comprising a quick-change fastening element, short-term reconfiguration or configuration of a means of transport, for example of an aircraft, comprising a rest arrangement according to the invention may be achievable.

If an aircraft is used on a flight connection which due to the flight duration does not require an additional aircrew, or for which route other available relaxation facilities are available in adequate numbers, then the rest arrangement according to the invention may be reconfigurable quickly, possibly within the stand-by time between two flights, in other words possibly on the same day at short notice; the rest arrangement according to the invention may thus be able to be removed or fitted.

(Temporary) removal of a rest arrangement may create additional stowage space and furthermore as a result of the weight saved in this manner may further reduce kerosene consumption of an aircraft.

According to a further exemplary embodiment of the present invention, the rest arrangement may be arranged in a door region, in particular essentially directly adjacent to a door.

Such an arrangement may preferably use only a space that is required for a short time during boarding and deboarding, during catering and/or cleaning a means of transport, e.g. an aircraft, in the region of an aircraft entrance door for a rest arrangement according to the invention. Due to the generous dimensions of an aircraft entrance door and the directly adjacent region, which dimensions are prescribed by the regulatory framework, in the absence of some other use during the flight said region may usually be considered to be an empty region that is not made use of.

Thus a rest arrangement according to the invention may essentially be implemented even without taking up additional space in the aircraft cabin.

It should be noted that when in the context of the present invention reference is made to a transition or pivoting between a first state and a second state, this also refers to the converse procedure, namely the transition or pivoting between a second state and a first state.

However, the rest arrangement according to the invention may be implemented not exclusively in the region of an aircraft entrance door but, for example, may also be used in a conventional crew rest compartment in order to allow an alternative use of the aforesaid.

BRIEF DESCRIPTION OF THE DRAWINGS

Below, exemplary embodiments of the present invention are shown in the figures and are furthermore explained in more detail.

Identical or similar components in different figures have the same or similar reference characters.

The illustrations in the figures are diagrammatic and not to scale, however they may depict qualitative proportions.

Implementation of the invention is not limited to the preferred embodiments shown in the figures. Instead, a plurality of variants is conceivable which use the solution shown and the principle according to the invention even in the case of fundamentally different embodiments.

Figure 1:
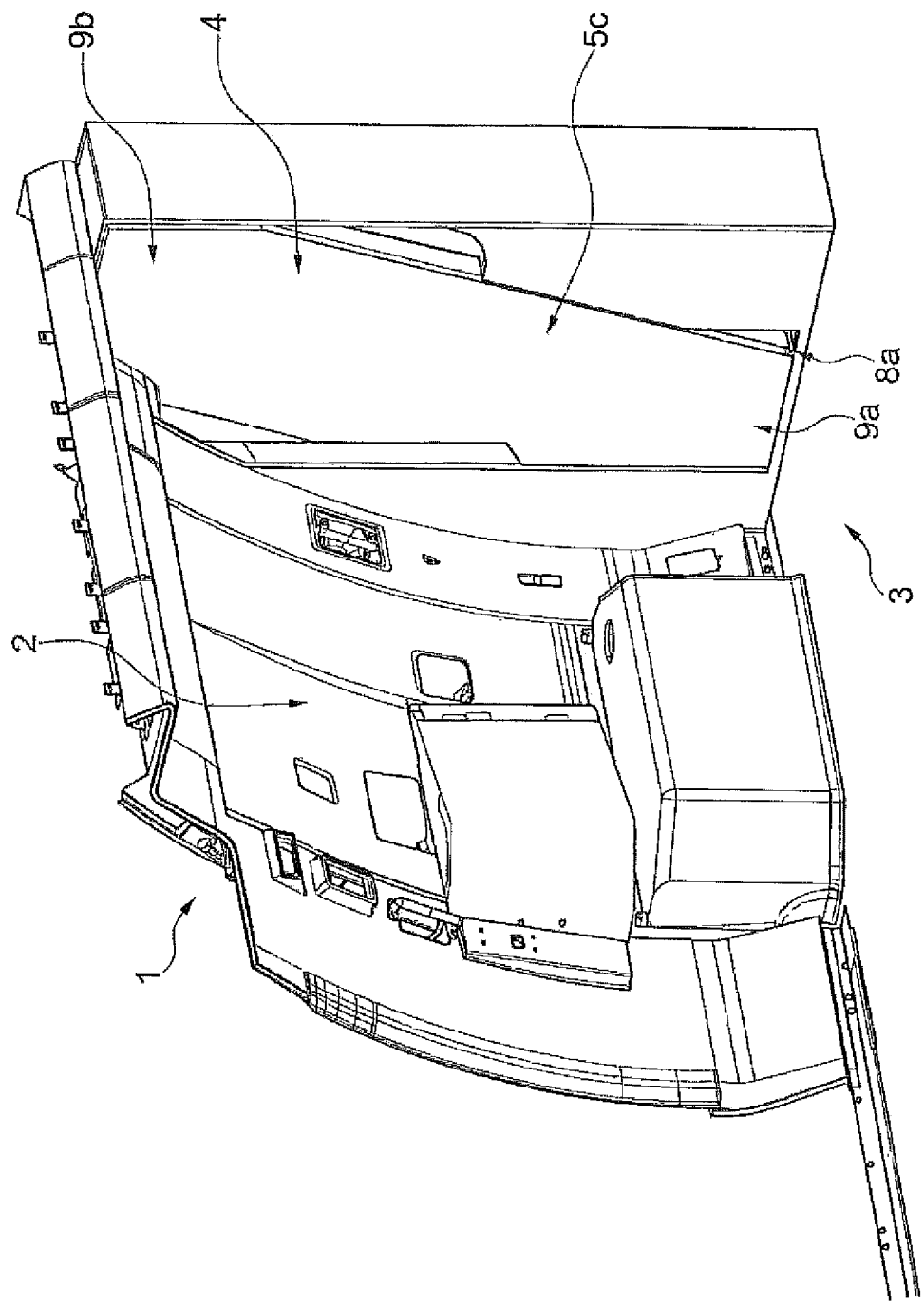
Figure 2A:
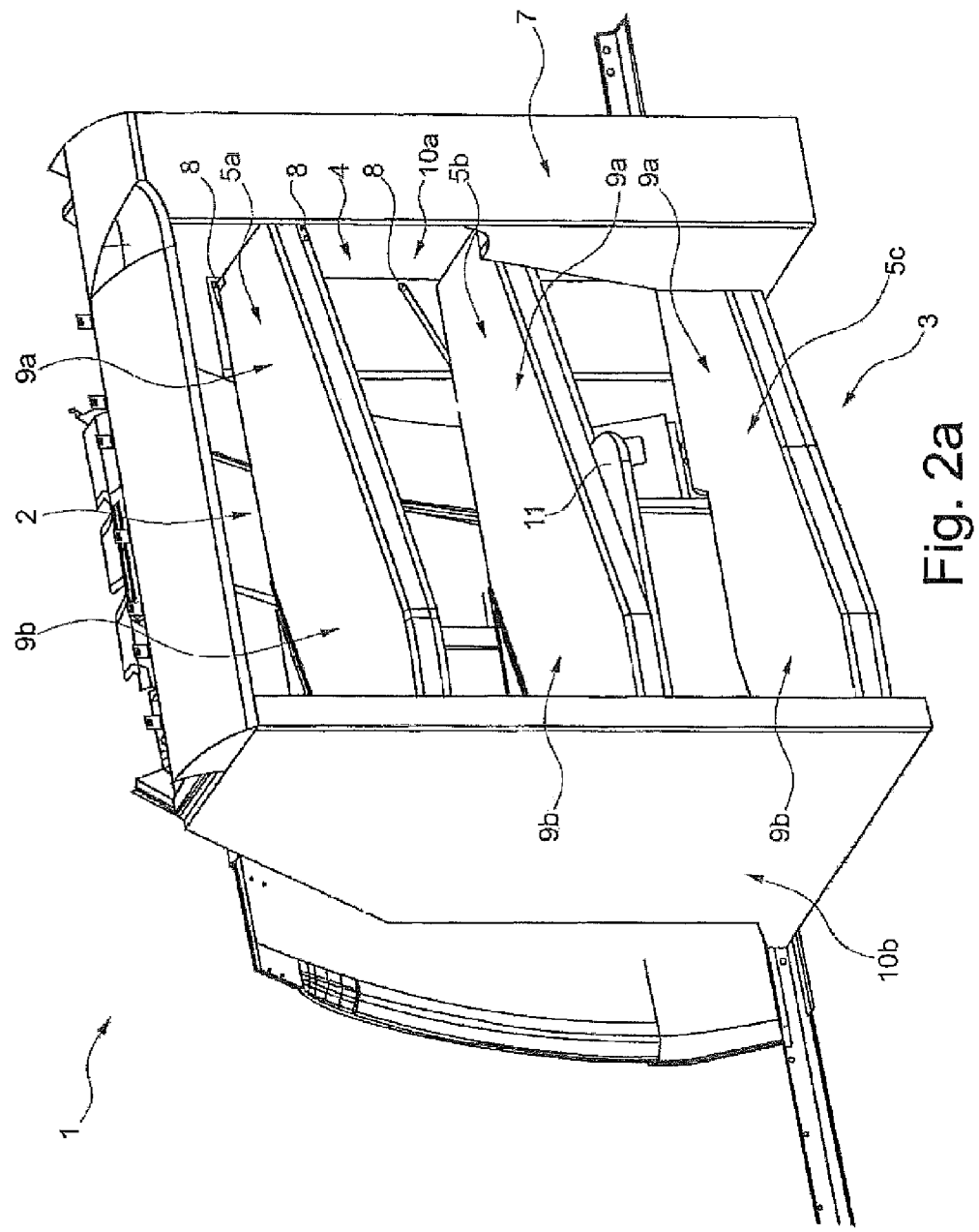
Figure 3A:
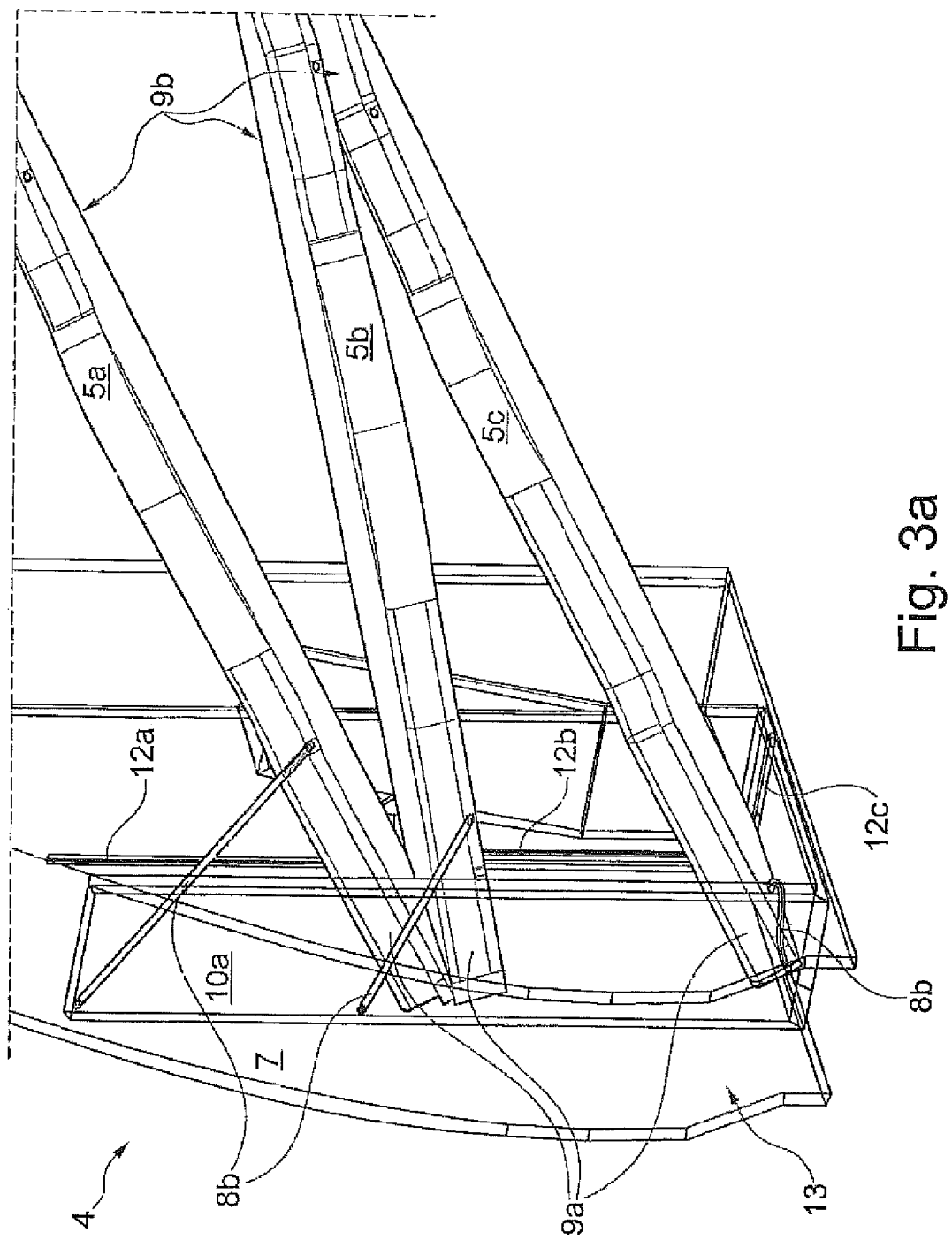
Figure 3B:
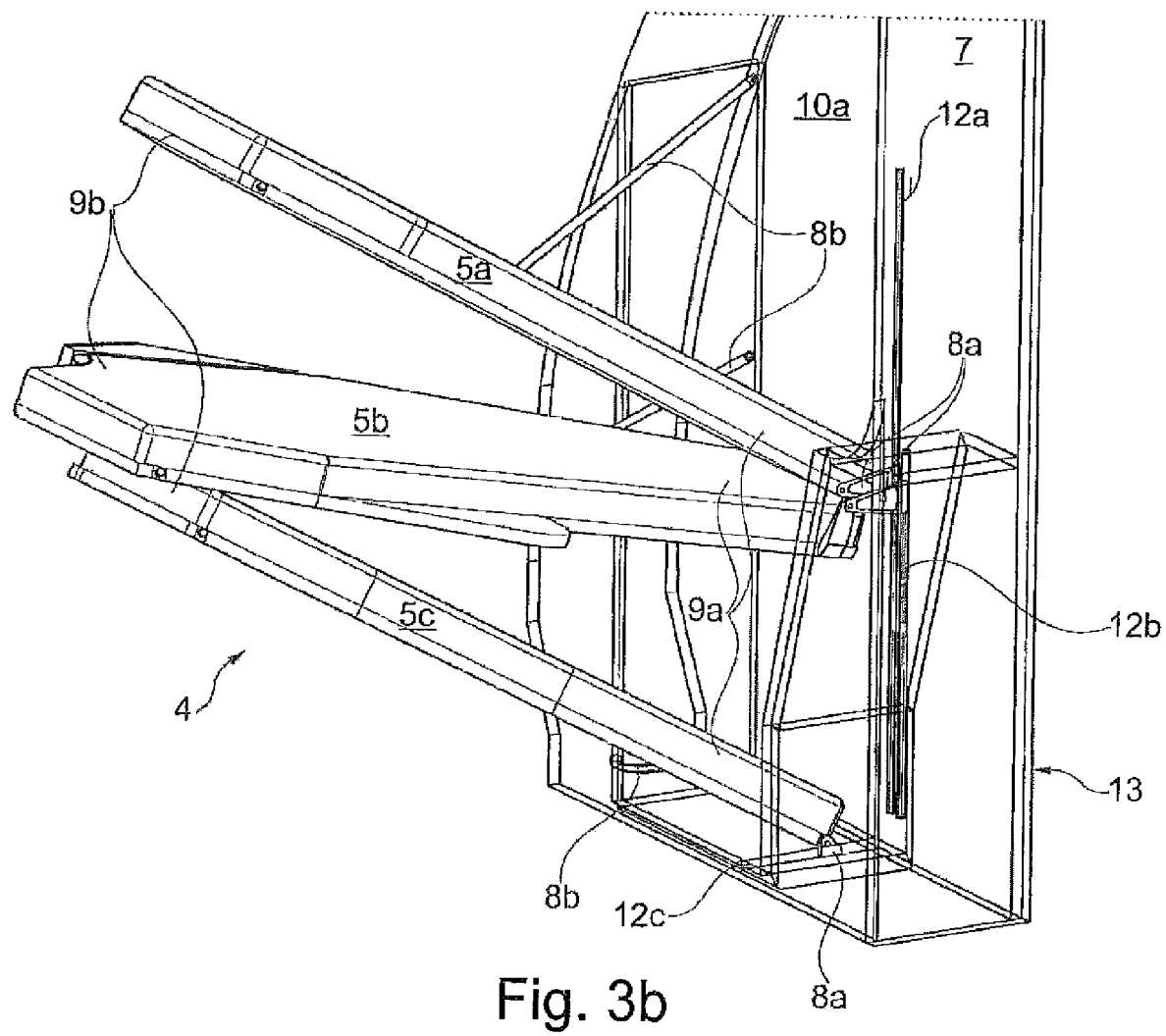

It shows:

FIG. 1 an exemplary embodiment of a region of an aircraft entrance door according to the present invention in the second state, FIGS. 2a, b exemplary embodiments of the present invention in the first state, FIGS. 3a, b detailed views of exemplary embodiments of the present invention in the transition between the first and the second state, and FIGS. 4a to h detailed illustrations of a transition of an exemplary embodiment of the present invention between a first and a second state.

DETAILED DESCRIPTION OF EXEMPLARY EMBODIMENTS

Furthermore, with reference to FIG. 1 an exemplary embodiment of the present invention in the second state is described.

FIG. 1 shows a section of an aircraft fuselage 1, in particular an aircraft interior comprising an aircraft door 2 and a region 3 arranged in front of it. On the side of the aircraft door 2 a rest arrangement 4 according to the invention is provided, which in the present state is arranged in the second state.

The illustration shows the underside of the lying-down facility 5c. The underside essentially finishes off in a planar and flat manner with a monument of the aircraft interior 7 in which the rest arrangement 4 according to the invention is accommodated. A recess forms a fastening element 8a, fastened to the floor of the monument 7 and shown in the first fastening region 9a of the lying-down facility 5c. In this arrangement the fastening element 8a is designed as a slidable pivot joint.

In this arrangement the shape of the lying-down facility 5c matches the shape of the aircraft door 2 or of its installations in order to make possible a direct connection, in particular without any openings or gaps.

Furthermore, with reference to FIGS. 2a and b exemplary embodiments of the present invention in the first state are described.

Figure 2B:
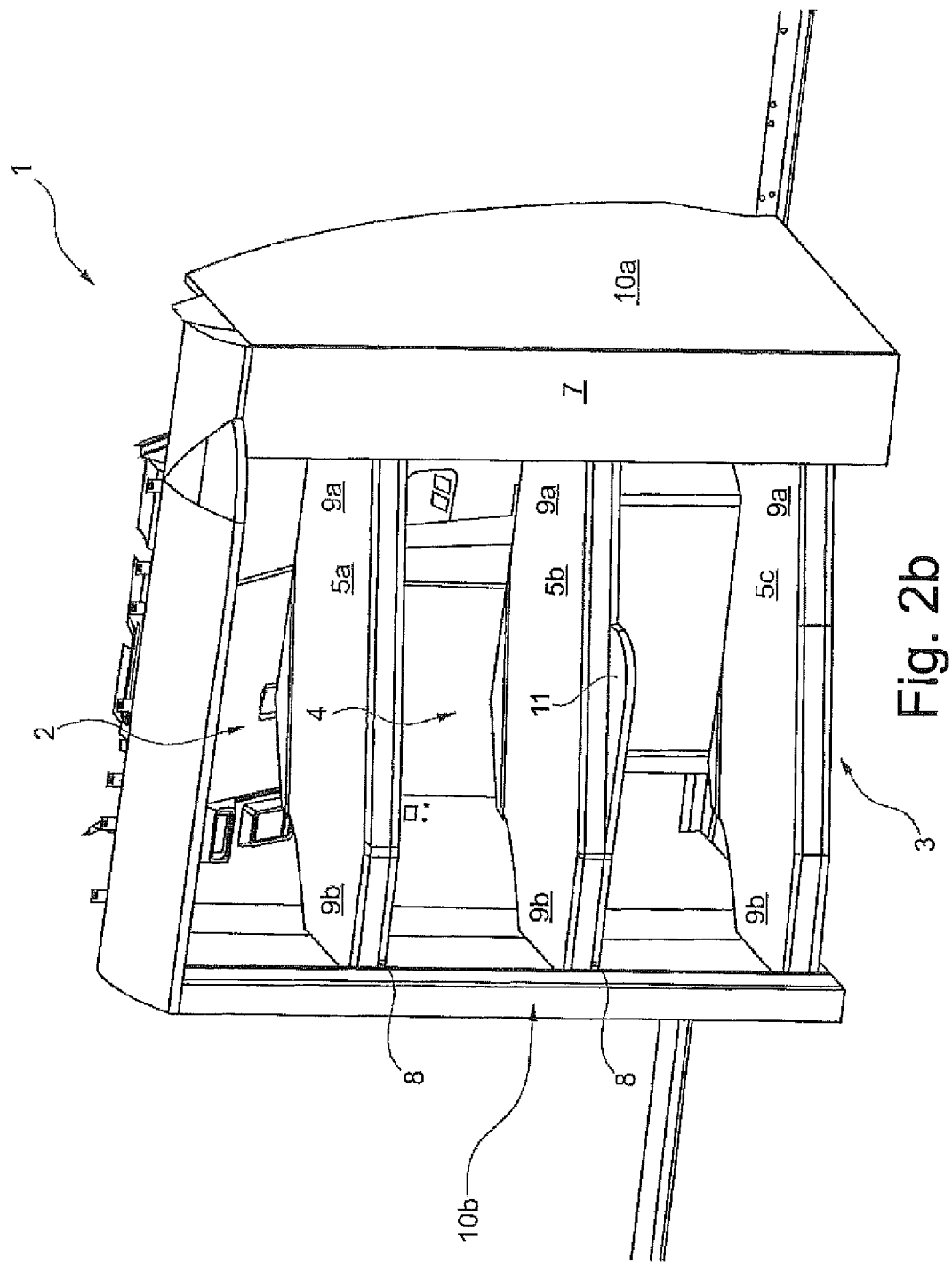

FIGS. 2a and 2b differ by a slightly different angle of view.

FIG. 2a shows the region of the aircraft entrance door 3 with the aircraft entrance door 2 situated behind it. In this arrangement the monument 7 on the side of the aircraft entrance door 2 at the same time represents the first support element 10a. The rest arrangement 4 comprises three lying-down facilities 5a, b, c with slightly changed geometric shapes in order to in a particularly preferred manner match the rear geometry of the aircraft fuselage 1 with the aircraft door 2. Fastening elements 8 hold or arrest the respective first fastening region 9a of the lying-down facilities 5a, b, c.

As an example, the fastening elements 8 in FIG. 2a for each lying-down facility 5a, b, c are designed as slidable pivot joints in combination with struts.

The middle lying-down facility 5b shown in the illustration comprises a step section 11 which makes it possible to easily step up to the top lying-down facility 5a. A second support element 10b, in the present illustration shown as a wall of an aircraft interior, makes possible the lever-free support of the lying-down facilities 5a, b, c in the second fastening region 9b.

FIG. 2b shows fastening elements 8 in a slightly altered perspective, which fastening elements 8 engage the second support element 10b and thus make it possible for the lying-down facilities 5a, b, c to safely rest on the first and second support element 10a, b between the first and the second fastening region 9a, b.

It is equally imaginable for the lying-down facilities 5a, b, c to rest on the second support element 10b merely on an edge or a projection, or to comprise their own support structures, e.g. support elements that fold out from the underside, for example legs, by means of which propping up on the floor becomes possible.

Furthermore, referring to FIGS. 3a, b, a detailed view of an exemplary embodiment of the present invention in the transition between the first and the second state is described.

In this arrangement FIG. 3a shows a rest arrangement 4 comprising three lying-down facilities 5a, b, c, wherein the lying-down facilities 5a, b, c are fastened in/to the monument 7 which at the same time acts as the first support element 10a. The lying-down facility 5c is fastened in the lower region, the floor region, of the monument 7.

In this arrangement a fastening element 8a is arranged as a pivot joint, which in addition is slidably arranged on or in a linear guide or link slide 12c. Thus the lying-down facility 5c during the transition from the second state to the first state may essentially be displaced in the direction of the rear wall 13 of the monument 7. A corresponding slidability on the linear guide 12c makes it possible to provide approximately identical dimensions for all three lying-down facilities 5a, b, c while at the same time, however, in the second state providing a stowage option with lying-down facilities 5a b, c placed one on top of the other.

In this illustration the fastening elements 8a, b of the lying-down facilities 5a, b are in each case, for example, designed as a slidable pivot joint in combination with a strut. The slidable pivot joint of the lying-down facility 5a is guided in a linear guide 12a which essentially extends from the lying height of the lying-down facility 5a in the direction of the floor of the monument 7 or of the first support element 10a.

The slidable pivot joint of the lying-down facility 5b is arranged in a linear guide 12b which essentially extends from the lying height of the lying-down facility 5b in the direction of the floor of the monument 7. Likewise it may be imaginable for the linear guides 12 a, b to be designed as a unit, wherein the slidable pivot joints of the lying-down facilities 5a, b engage the same linear guide.

On the side of the first fastening region 9a of the lying-down facilities 5a, b, which side faces the slidable pivot joint, in FIGS. 3a, b as an example a strut is shown as a fastening element.

The resulting rigid attachment of the fastening points of the strut on the monument and on the lying-down facility 5a, b means that the respective attachment points of the strut on the lying-down facilities 5a, b essentially carry out a circular movement on the attachment point of the strut on the monument.

Together with the slidable pivot joint this thus results in a defined rotational movement and translational movement of the lying-down elements 5a, b. A corresponding embodiment is also imaginable in relation to the lying-down facility 5c, however, in this illustration shown as an example with a linear guide 12c that is arranged so as to be essentially perpendicular to the linear guides 12a, b, as well as with a link slide as a second fastening element 8b.

It is also imaginable for one or both of the fastening elements 8a, b to be provided not only on one side but also on the other side of the lying-down facilities 5a, b, c. It is thus imaginable for both the fastening elements 8a, b that are arranged on the first fastening region 9a to be designed as struts or cables or link slides, or alternatively as slidable pivot joints.

Furthermore referring to FIGS. 4a to h a detailed view of a transition of an exemplary embodiment of the present invention between the first and the second state is described.

FIGS. 4a to h show lying-down facilities 5a, b, c. On one side of the first fastening region 9a the lying-down facilities 5a, b, c are connected to the first support element 10a by means of fastening elements 8. In each case a fastening element 8b of each lying-down facility 5a, b is designed as a strut or as a cable in the case of the lying-down facility 5c, while the respective other fastening element 8a is designed as a slidable pivot joint, in the case of the first lying-down facility 5a affixed to the linear guide 12a. The slidably held pivot joint of the lying-down facility 5c is affixed to the linear guide 12c.

Figure 4A:
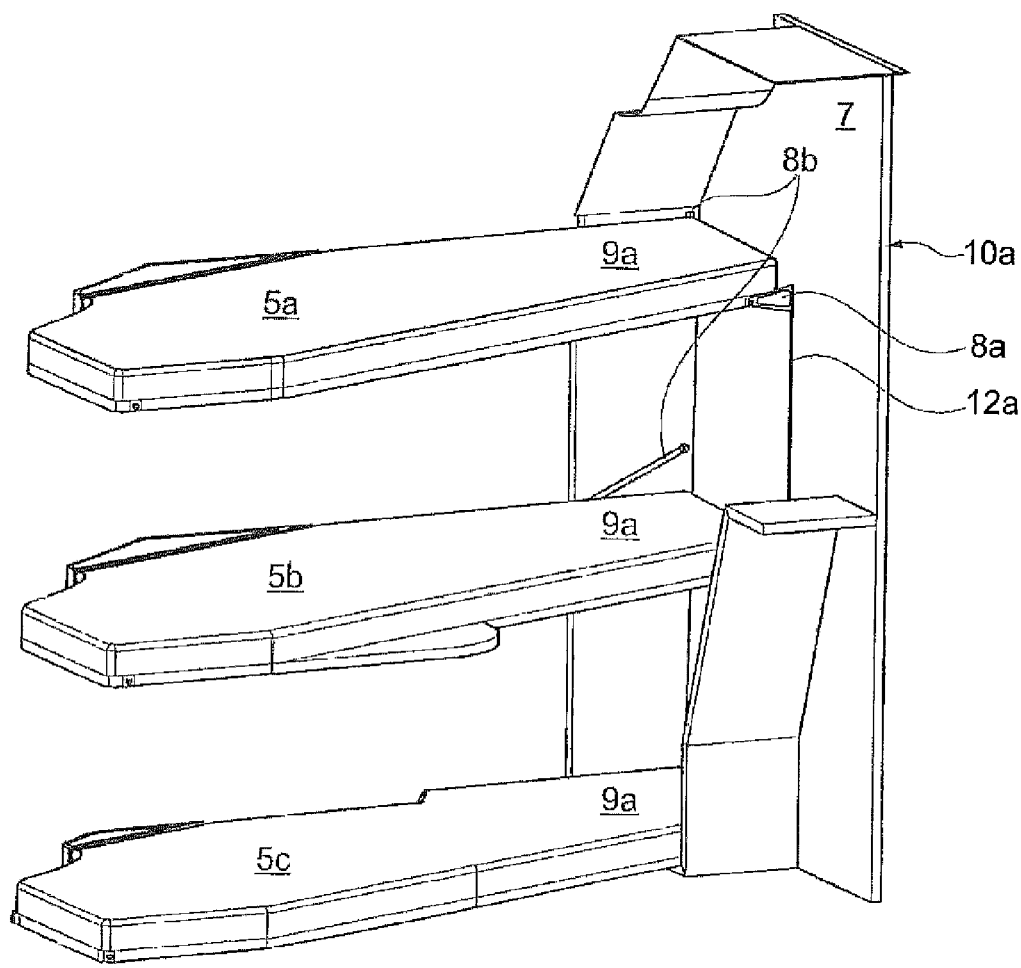

FIG. 4a shows the first state, without showing fastening of the second fastening region 9b to the second support element 10b. All the lying-down facilities 5a, b, c are arranged horizontally so as to be relative to each other and thus parallel to each other.

Figure 4B:
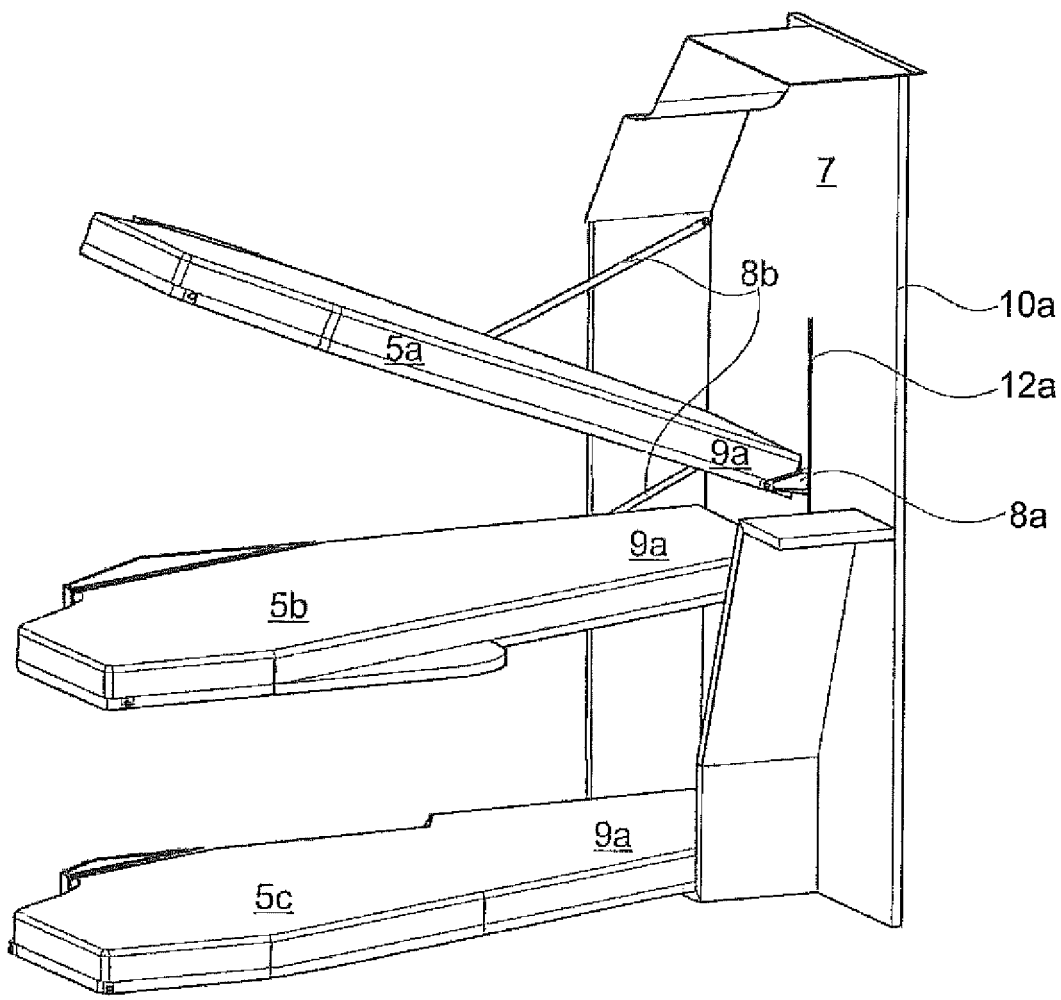

In a first step, as shown in FIG. 4b, the lying-down facility 5a is hinged upwards. In this process the slidably held pivot joint 8a moves downwards, and the lying-down facility 5a carries out a rotational movement on the affixation point of the strut 8b and thus at the same time a movement along the linear guide 12a.

Figure 4C:
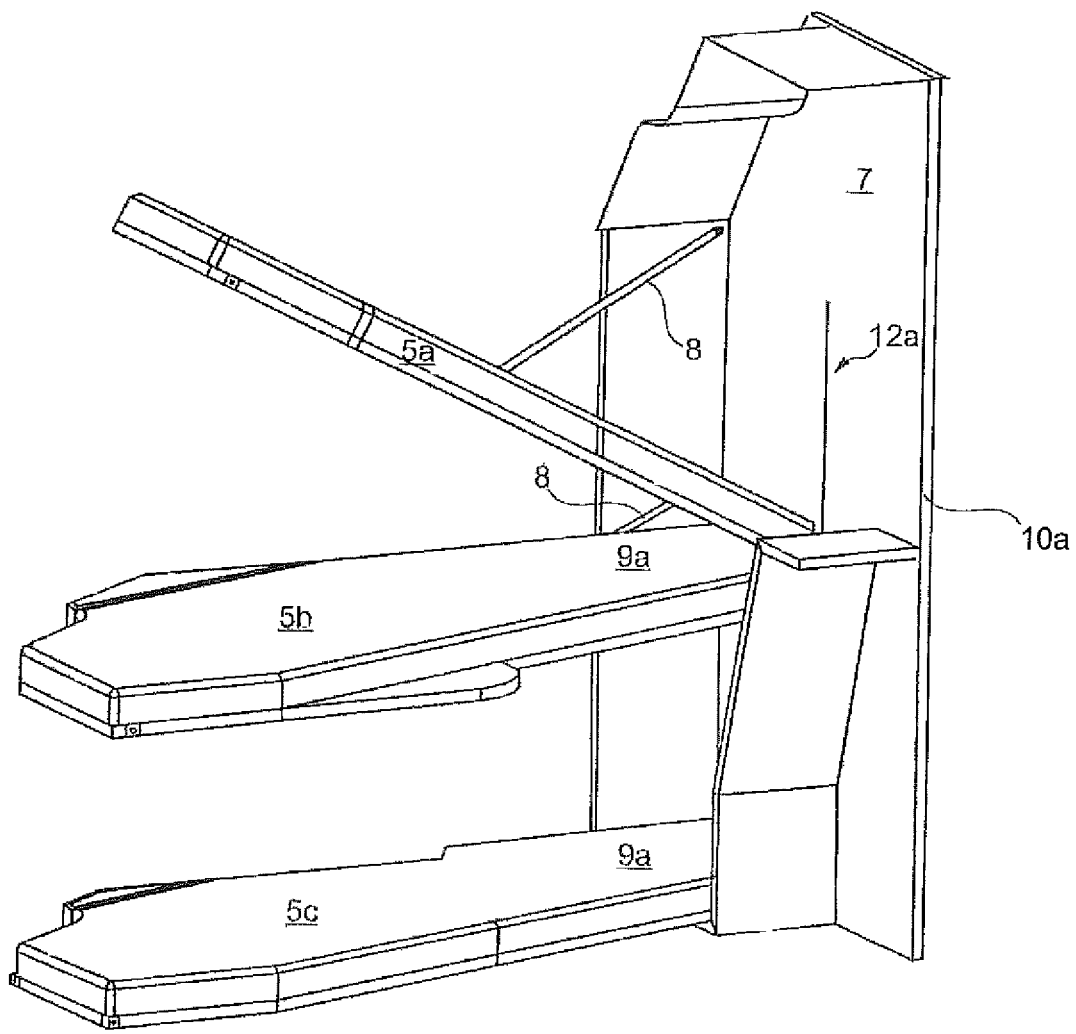

Prior unlocking of a locked fastening element 8a may have been carried out. Movement of the first lying-down facility 5a in the region of the first fastening region 9a downwards is continued, as shown in FIG. 4c, until the end of the first fastening region 9a has reached the first fastening region 9a of the lying-down facility 5b.

Figure 4D:
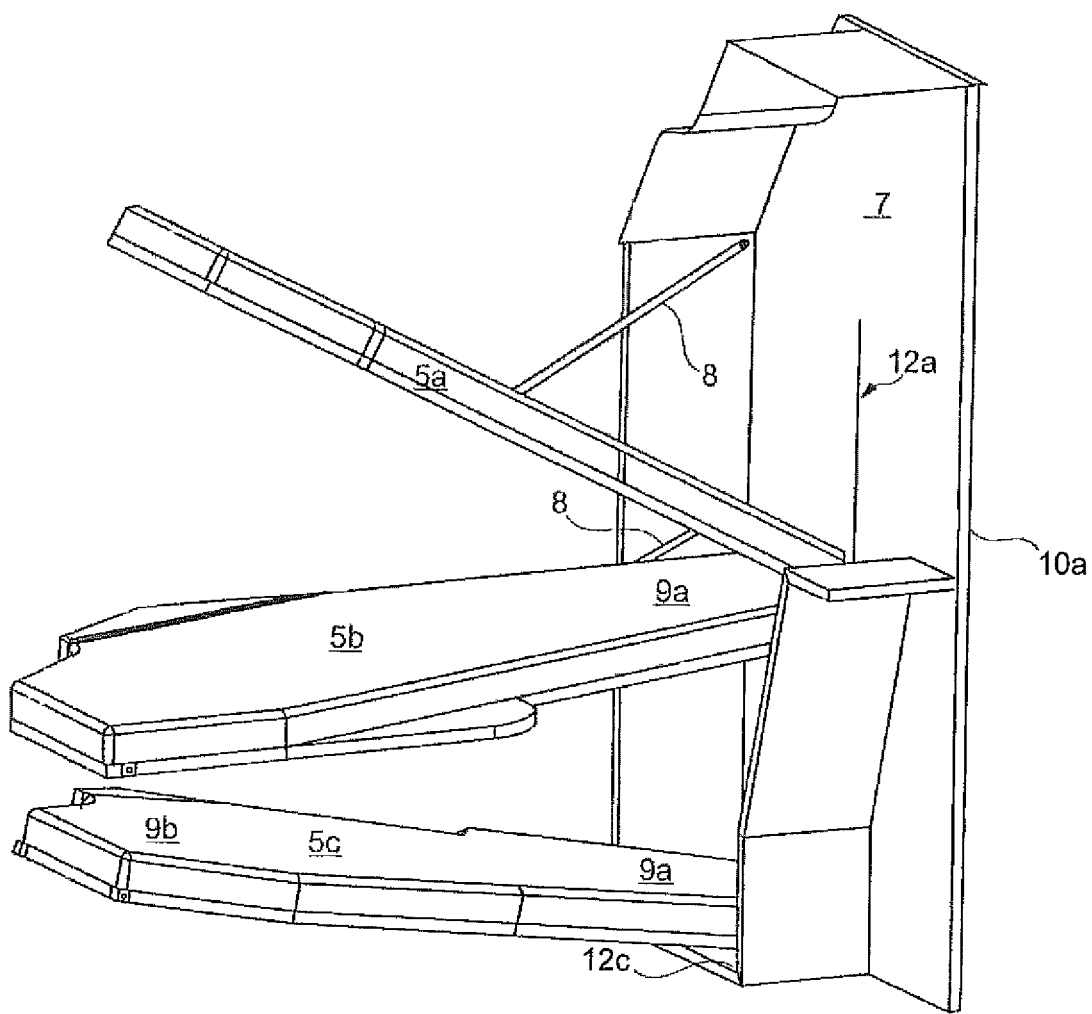

FIG. 4d shows the manner in which subsequently the lying-down facility 5c, with its second fastening region 9b facing upwards, is guided in the direction of the underside of the lying-down facility 5b. In this arrangement the pivot point is the fastening element 8a (not shown in FIG. 4d), adapted as a slidable pivot joint arranged on the linear guide 12c.

Figure 4E:
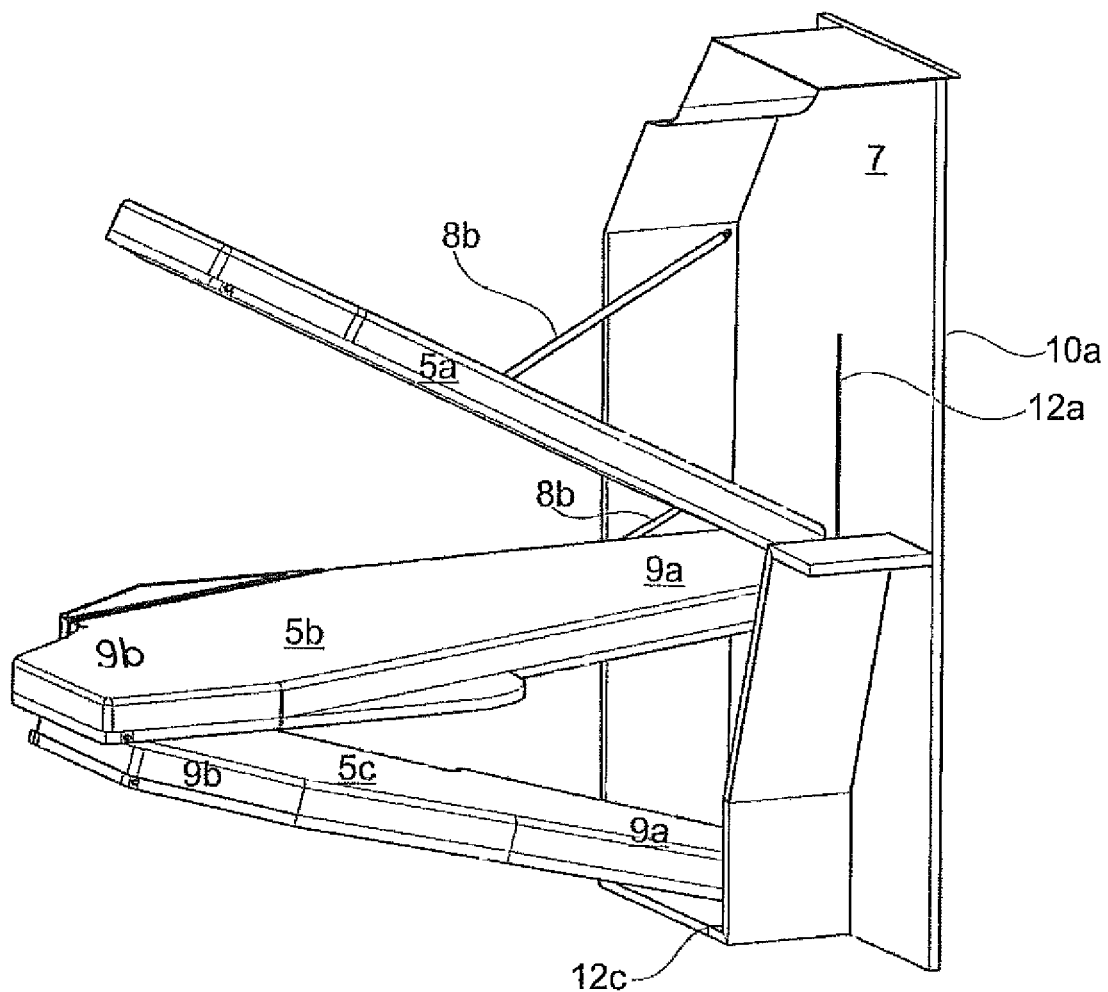

As shown in FIG. 4e, the rotational movement of the lying-down facility 5c towards the top is carried out until the second fastening region 9b of the lying-down facility 5c comes to rest against the second fastening region 9b of the lying-down facility 5a. The fastening elements 8 of the lying-down facility 5c also may have been undone or unlocked prior to a corresponding movement.

Figure 4F:
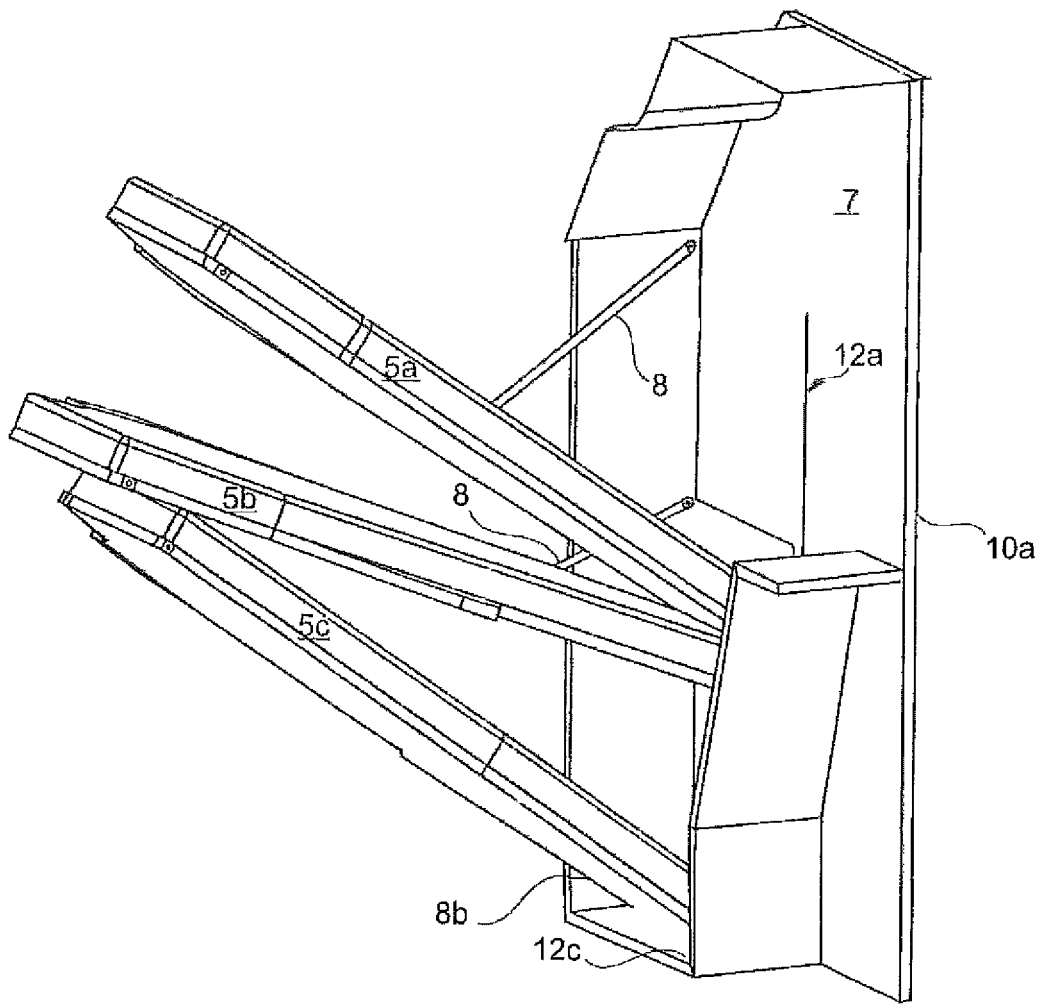

Subsequently in FIG. 4f the lying-down facility 5b is also inclined, in this arrangement guided by means of its fastening elements 8a, b, designed as a strut as well as a slidable pivot joint. The linear guide 12b of the slidable pivot joint of the lying-down facility 5b is also covered up in FIG. 4f. Furthermore, the second fastening element 8b of the lying-down facility 5c is shown, which may be designed as a link slide.

Figure 4G:
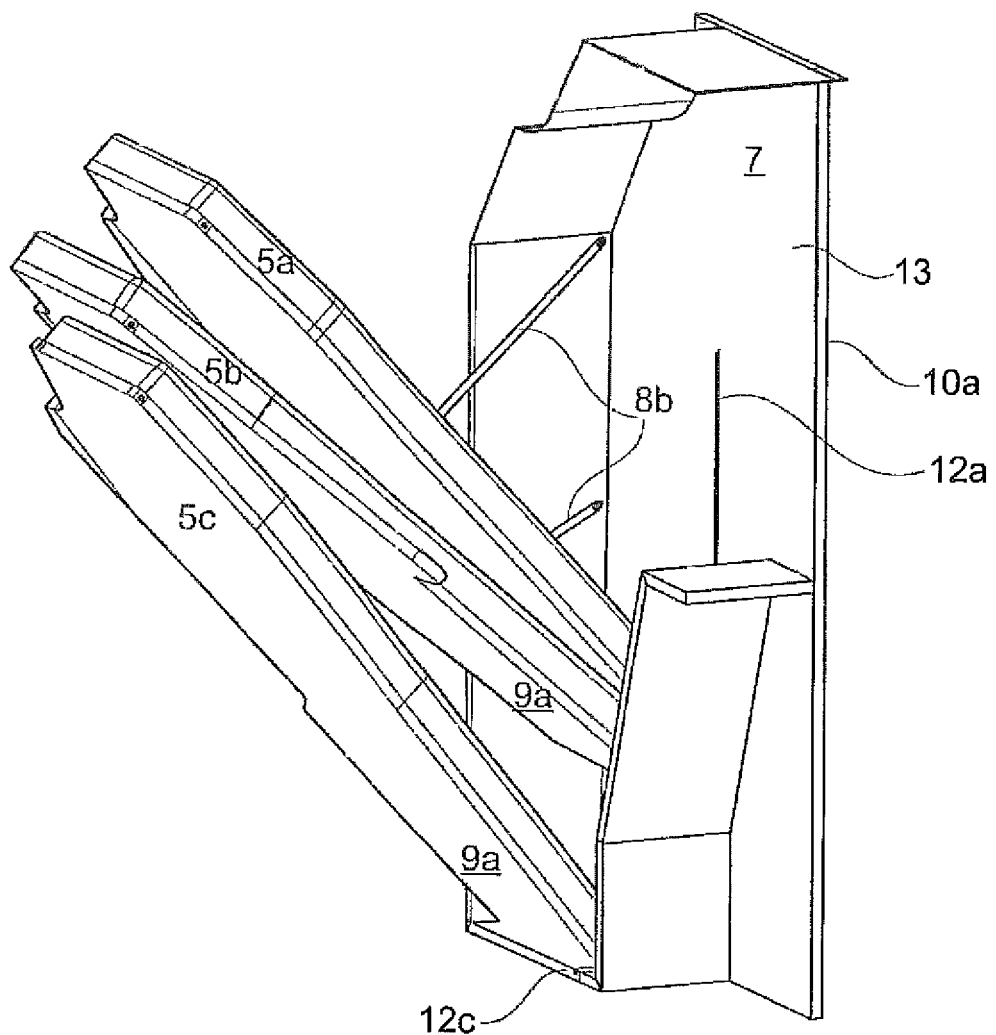

The downwards movement of the first fastening regions 9a of the lying-down facilities 5a, b in the direction of the cabin floor is continued, as shown in FIG. 4g. In this process the lying-down facilities 5a, b tilt further in the direction of the rear wall 13 of the monument 7 and thus take up a vertical position.

The lying-down facility 5c follows this movement, however, by way of its slidably held pivot joint it slides on the linear guide 12c away from the rear wall 13, thus making it possible for the lying-down facilities 5a, b to slide behind and thus positioning between the rear wall 13 and the first fastening region 9a of the lying-down facility 5c.

Figure 4H:
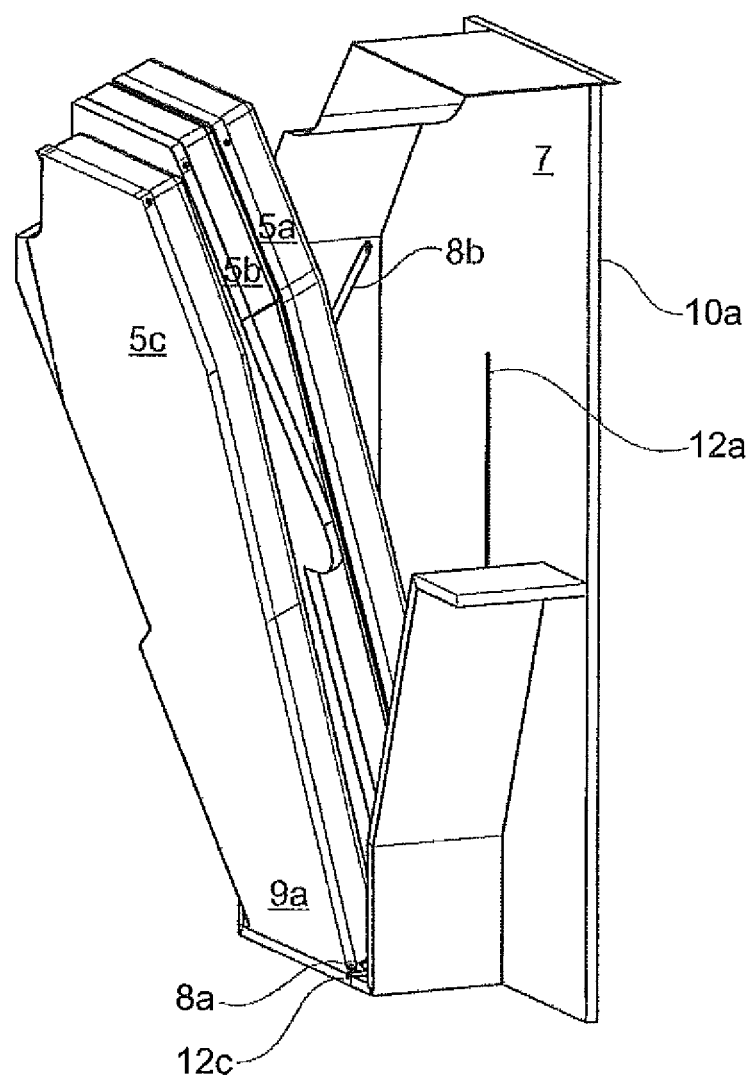

The second state has almost been reached in FIG. 4h. The lying-down facilities 5a, b, c are essentially placed one on top of the other in a tightly packed manner even if they are not yet in a vertical position. The fastening element 8a of the lying-down facility 5c may essentially be in its frontmost position in the linear guide 12c and provide space for the lying-down facilities 5a, b between the lying-down facility 5c and the rear wall 13. If tilting or placing vertically the lying-down facilities 5a, b, c is continued further, then eventually this results in an arrangement as shown in FIG. 1.

In order to fold up the exemplary embodiment according to FIGS. 4a to h the lying-down facilities may first be unlocked at the second support element. Subsequently, locking of the slidable pivot joint at the lying-down facility 5a may be carried out. When the first fastening region 9a of the lying-down facility 5a rests against the first fastening region 9a of the lying-down facility 5b, unlocking of the lying-down facilities 5b and 5c may take place.

Subsequently the lying-down facility 5c may be raised in its second fastening region 9b and may then be pushed against the lying-down facilities 5a, b until all the lying-down facilities 5a, b, c are in a vertical position. In a vertical position the lying-down facilities 5a, b, c may be fixed in the housing or monument 7.

Force support, for example by means of spring elements (not shown in detail), may reduce the forces needed for sliding or for conversion and may determine constellations in which the rest arrangement 4 is essentially stable without the influence of force.

Also imaginable is force support by means of actuators or an automatic or semi-automatic drive for moving the rest arrangement 4 with the use of actuators.

By means of the diagonal arrangement, shown as an example, of the lying-down facilities 5a, b, c the required length of the lying-down facilities for reaching the desired length of an area for lying down of the lying-down facilities may be additionally reduced.

Furthermore, it is imaginable for the monument 7, shown as a unit for example in FIG. 4h, to comprise a quick-change fastening element which makes it possible to detach the monument 7 entirely, in particular completely in the closed second state, from the rest of the aircraft interior or the aircraft structure so as to remove said monument 7 from the aircraft when it is not required.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments or exemplary designs of the present invention can also be used in combination with other characteristics or steps of other exemplary embodiments or exemplary designs of the present invention. Reference characters in the claims are not to be interpreted as limitations.

LIST OF REFERENCE CHARACTERS

1 Aircraft fuselage
2 Aircraft door
3 Region of the aircraft door
4 Rest arrangement
5a, b, c Lying-down facility
7 Monument
8a, b First, second fastening element
9a, b First, second fastening region
10a, b First, second support element
11 Foot step
12a, b, c Linear guide
13 Rear wall of the monument

The invention claimed is:

1. A rest arrangement, comprising:
a first support element; and
a lying-down facility comprising a first fastening region;
wherein the first fastening region comprises a first fastening element and a second fastening element; and
wherein the lying-down facility is affixed to the first support element by the first and second fastening elements;
wherein the lying-down facility is pivotable between a first state wherein the lying-down facility is arranged so as to be substantially horizontal, and a second state, wherein the lying-down facility transitions between the first state and the second state through a combined rotational movement and translational movement;
wherein the lying-down facility comprises a second fastening region configured to affix the lying-down facility to a second support element in the first state; and
wherein the lying-down facility is configured to disengage from the second support element in the second state.

2. The rest arrangement of claim 1, further comprising at least one second lying-down facility, wherein, in the first state, the lying-down facilities are arranged one on top of the other.

3. The rest arrangement of claim 1, wherein at least one of the first fastening element or the second fastening element comprises a pivot joint and is slidably affixed to the first support element.

4. The rest arrangement of claim 1, wherein at least one of the first fastening element or the second fastening element is selected from the group consisting of a strut, cable and link slide.

5. The rest arrangement of claim 1, wherein at least one of a first fastening element, a second fastening element, a first fastening region or a second fastening region is adapted for detachably affixing the lying-down facility in at least one of the first state or the second state.

6. The rest arrangement of claim 1, wherein, in the second state, the lying-down facility is arranged so as to be substantially vertical.

7. The rest arrangement of claim 1, wherein the lying-down facility comprises a single-piece structure for lying down.

8. The rest arrangement of claim 1, further comprising at least one of a force support element or an actuator, adapted for at least one of supporting or automatically pivoting the lying-down facility between the first state and the second state.

9. The rest arrangement of claim 1, wherein the first and second fastening regions are spaced apart from one another along a longitudinal axis of the lying-down facility.

10. The rest arrangement of claim 2, wherein the lying-down facilities are configured to move independently of one another.

11. A means of transport, comprising a rest arrangement, the rest arrangement comprising:
a first support element; and
a lying-down facility comprising a first fastening region;
wherein the first fastening region comprises a first fastening element and a second fastening element; and
wherein the lying-down facility is affixed to the first support element by the first and second fastening elements;
wherein the lying-down facility is pivotable between a first state wherein the lying-down facility is arranged so as to be substantially horizontal, and a second state, wherein the lying-down facility transitions between the first state and the second state through a combined rotational movement and translational movement;
wherein the lying-down facility comprises a second fastening region configured to affix the lying-down facility to a second support element in the first state; and
wherein the lying-down facility disengages from the second support element in the second state.

12. The means of transport of claim 11, wherein the first support element comprises a quick-change fastening element for detachably affixing the first support element to an element of a structure of the means of transport.

13. The means of transport of claim 11, wherein the rest arrangement is arranged in a door region.

14. The means of transport of claim 11, wherein the second support element comprises a wall within the means of transport.

* * * * *

UNITED STATES PATENT AND TRADEMARK OFFICE
CERTIFICATE OF CORRECTION

| | | |
|---|---|---|
| PATENT NO. | : 8,413,268 B2 | Page 1 of 1 |
| APPLICATION NO. | : 13/060312 | |
| DATED | : April 9, 2013 | |
| INVENTOR(S) | : Stefan Amstutz and Holger Warner | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this
Ninth Day of July, 2013

Teresa Stanek Rea
*Acting Director of the United States Patent and Trademark Office*